United States Patent
Tzur-David et al.

(10) Patent No.: US 11,663,318 B2
(45) Date of Patent: May 30, 2023

(54) DECENTRALIZED PASSWORD VAULT

(71) Applicant: SECRET DOUBLE OCTOPUS LTD, Tel-Aviv (IL)

(72) Inventors: Shimrit Tzur-David, Mevaseret Zion (IL); Chen Tetelman, Tel Aviv (IL); Amit Rahav, Tel Aviv (IL)

(73) Assignee: Secret Double Octopus Ltd., Tel-Aviv (IL)

( * ) Notice: Subject to any disclaimer, the term of this patent is extended or adjusted under 35 U.S.C. 154(b) by 262 days.

(21) Appl. No.: 17/158,050

(22) Filed: Jan. 26, 2021

(65) Prior Publication Data
US 2022/0237282 A1   Jul. 28, 2022

(51) Int. Cl.
| | | |
|---|---|---|
| *G06F 21/45* | (2013.01) | |
| *H04L 9/30* | (2006.01) | |
| *H04L 9/40* | (2022.01) | |
| *G06F 21/60* | (2013.01) | |

(52) U.S. Cl.
CPC ............ *G06F 21/45* (2013.01); *G06F 21/602* (2013.01); *H04L 9/30* (2013.01); *H04L 63/0884* (2013.01); *H04L 63/126* (2013.01)

(58) Field of Classification Search
CPC ......... G06F 21/45; G06F 21/602; H04L 9/30; H04L 63/0884; H04L 63/126; H04L 9/0825; H04L 9/3226; H04L 63/0442; H04L 63/083
See application file for complete search history.

(56) References Cited

U.S. PATENT DOCUMENTS

| | | | | |
|---|---|---|---|---|
| 10,212,136 | B1* | 2/2019 | Gehret | H04L 63/083 |
| 2010/0138666 | A1* | 6/2010 | Adams | G07F 7/1091 |
| | | | | 713/186 |
| 2011/0016320 | A1* | 1/2011 | Bergsten | H04L 63/083 |
| | | | | 713/170 |
| 2012/0297190 | A1* | 11/2012 | Shen | H04L 9/0866 |
| | | | | 713/168 |
| 2015/0082397 | A1* | 3/2015 | Zhong | H04W 4/023 |
| | | | | 726/5 |
| 2016/0014110 | A1* | 1/2016 | Kurspahic | H04L 63/083 |
| | | | | 713/183 |
| 2016/0149705 | A1* | 5/2016 | Bobinski | H04L 9/0819 |
| | | | | 713/155 |
| 2019/0036913 | A1* | 1/2019 | Tzur-David | H04L 63/18 |
| 2019/0036914 | A1* | 1/2019 | Tzur-David | H04L 63/20 |
| 2019/0228406 | A1* | 7/2019 | Patel | G06F 16/24578 |
| 2020/0028679 | A1* | 1/2020 | Chumbley | H04L 9/0863 |
| 2020/0195630 | A1* | 6/2020 | Mallinson | H04W 12/068 |
| 2020/0259638 | A1* | 8/2020 | Carmignani | H04L 9/3239 |
| 2021/0176059 | A1* | 6/2021 | Hertrich | H04L 9/3271 |

* cited by examiner

*Primary Examiner* — J. Brant Murphy
(74) *Attorney, Agent, or Firm* — Pearl Cohen Zedek Latzer Baratz LLP

(57) ABSTRACT

A computer-based system and method for securing passwords, including: obtaining, by an authentication service, a plurality of public keys, each associated with one of a plurality of devices associated with a user; generating, by the authentication service, a password for the user; sending, by the authentication service, the password to a password management entity; encrypting, by the authentication service, the password with each of the public keys, thus generating a plurality of encrypted passwords, each encrypted with one of the public keys and associated with a device of the plurality of devices; and deleting the password by the authentication service.

20 Claims, 8 Drawing Sheets

DECENTRALIZED PASSWORD VAULT

FIELD OF THE INVENTION

The present invention relates generally to performing secure password management, and specifically, to performing a secure password management for online and offline login.

BACKGROUND

Many computer networks have a password database that may store passwords of users. When a user wants to log in to a device, e.g., a personal computer (PC) of the user referred to herein as a local device, the user may type a username and a password. The service may authenticate the local device and the user by comparing the password provided by the user to the one that is stored in the password database or use other protocol to authenticate the local device. The service may authorize the login request if the local device is authenticated and refuse the login request otherwise. For example, in Windows® domain networks, those services may be provided by the Active Directory® (AD) system. Some computer networks may include a second entity in the flow, referred to herein as an identity provider (IdP) or an authentication service. The authentication service may be responsible for validating the user and for providing passwords.

The password database should be highly secured since once an attacker has access to the password database, an entire organization may be at risk. Today, to secure the password database, passwords in a password database are typically encrypted by encryption keys. These encryption keys must be saved elsewhere from the databased itself or must be secured in some other way. In some applications, the stored passwords are hashed. When possible, saving hashed passwords improves the security of the database but there are cases in which hashing the passwords in the password database is not possible or not enough.

SUMMARY

According to embodiments of the invention, a system and method for securing passwords may include obtaining, by an authentication service, a plurality of public keys, each associated with one of a plurality of devices associated with a user; generating, by the authentication service, a password for the user; sending, by the authentication service, the password to a password management entity; encrypting, by the authentication service, the password with each of the public keys, thus generating a plurality of encrypted passwords, each encrypted with one of the public keys and associated with a device of the plurality of devices; and deleting the password by the authentication service.

Furthermore, embodiments of the invention may include: obtaining, at the authentication service from a first device, a request to log in the user to the first device; and sending to the first device, by the authentication service, the encrypted password associated with the first device.

Furthermore, embodiments of the invention may include: obtaining, at the first device, the encrypted password associated with the first device; decrypting, at the first device, the encrypted password using a private key associated with the public key of the first device, to obtain the decrypted password; and using, by the first device, the decrypted password to perform the login.

Furthermore, embodiments of the invention may include: sending, by the authentication service, the password to a password management entity; verifying, by the password management entity, the local device using the password obtained from the authentication service; and allowing the login, by the password management entity, only if the decrypted password is verified.

Furthermore, embodiments of the invention may include: prior to sending the encrypted password associated with the first device, sending, by the authentication service, to a second device associated with the user, a request to identify the user; and obtaining verification of the identity from the second device.

Furthermore, embodiments of the invention may include: obtaining, at the authentication service, a request to associate with the user a third device that is not one of the plurality of devices, and a public key of the third device; generating, by the authentication service, a new password for the user; sending, by the authentication service, the new password to the password management entity; encrypting, by the authentication service, the new password with each of the public keys and with the public key of the third device, thus generating a plurality of new encrypted passwords, each associated with a device of the plurality of devices and with the new device; and deleting the new password by the authentication service.

Furthermore, embodiments of the invention may include: obtaining, at the authentication service, a request to change the password of the user; generating, by the authentication service, a new password for the user; sending, by the authentication service, the new password to the password management entity; encrypting, by the authentication service, the new password with each of the public keys, thus generating a plurality of new encrypted passwords, each associated with a device of the plurality of devices; and deleting the password by the authentication service.

Furthermore, embodiments of the invention may include: in a preparation stage, sending, to a second device associated with the user, by the authentication service, the encrypted password associated with the first device; performing a login to the first device when the authentication service is off-line by: sending from the first device to the second device a request to login the user to the first device; verifying the identity of the user by the second device; following a successful identification of the user, sending the encrypted password associated with the first device from the second device to the first device; decrypting, at the first device, the encrypted password using a private key associated with the public key of the first device, to obtain the decrypted password; and using the decrypted password to perform the login.

Furthermore, embodiments of the invention may include: in a preparation stage, sending, to a second device associated with the user, by the authentication service, the encrypted password associated with the second device and the public key of the first device; performing a login to the first device when the authentication service is off-line by: sending from the first device to the second device a request to log in the user to the first device; verifying the identity of the user by the second device; following a successful identification of the user: decrypting, by the second device, the encrypted password associated with the second device to obtain a clear password; encrypting, by the second device, the clear password with the public key of the first device to obtain the encrypted password associated with the first device; sending the encrypted password associated with the first device from the second device to the first device; decrypting, at the first device, the encrypted password using a private key associated with the public key of the first device, to obtain the decrypted password; and using the decrypted password to perform the login.

Furthermore, embodiments of the invention may include: in a preparation stage, sending, to a second device associated with the user, by the authentication service, the encrypted password associated with the second device; performing a login to the first device when the authentication service is off-line by: decrypting, by the second device the encrypted password associated with the second device; verifying the identity of the user by the second device; following a successful identification of the user, presenting the decrypted password to the user; obtaining, at the first device, the decrypted password from the user; and using the decrypted password to perform the login.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
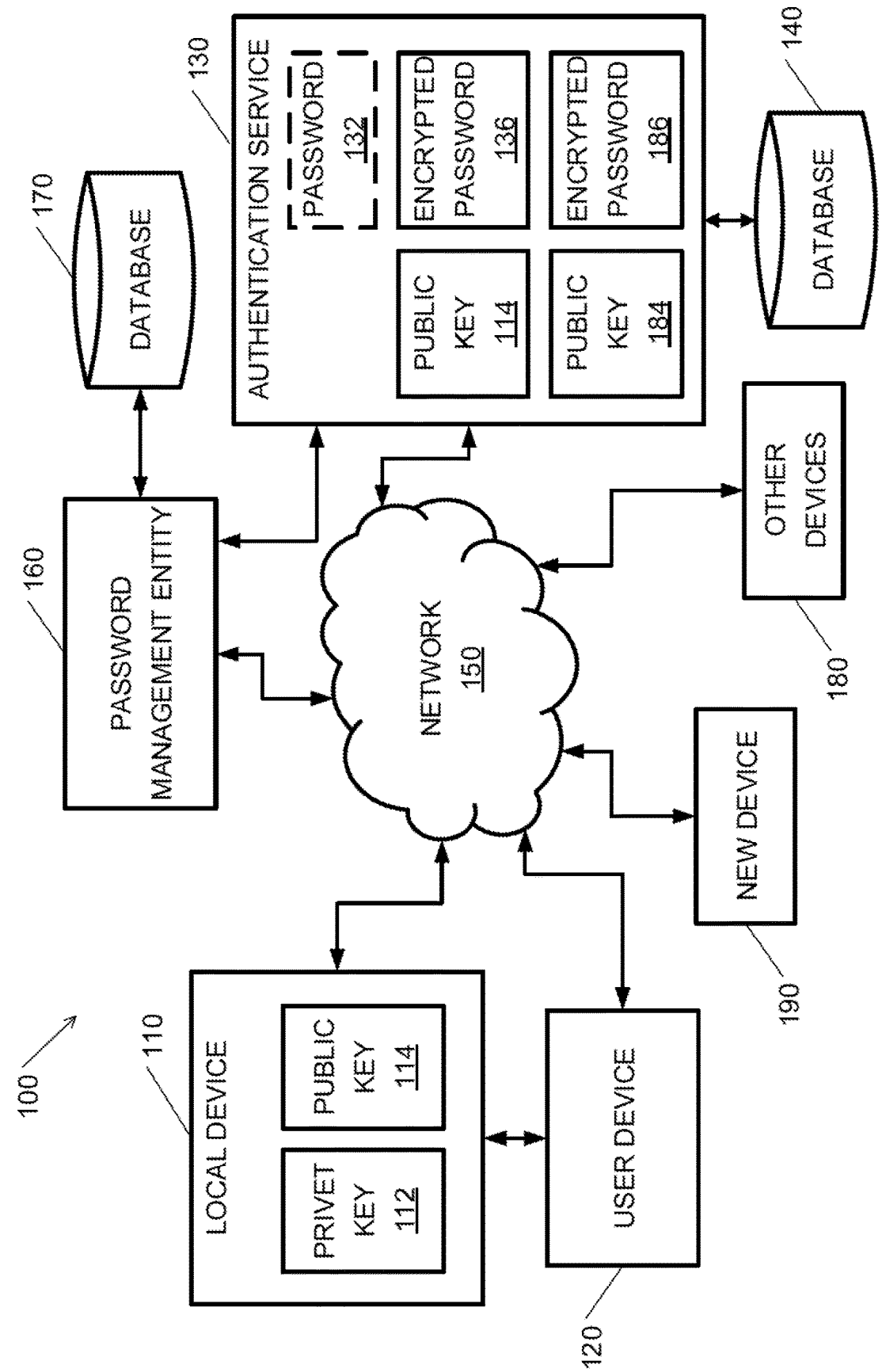
FIG. 1 is a system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

In typical computer networks, a user may log in to a computer, referred to herein as a local device, by providing a username and a password, or other credentials, to the local device, e.g., to an agent Application Programming Interface (API) installed on the local device. The name, password and other credentials of the user may be used to identify and authenticate the user. In a next step, the local device may provide the username and password (or other credentials) to a password management entity. The password management entity may authenticate the local device using the password of the local device and a password stored in the password management entity or use other protocol (e.g., a challenge response protocol) to authenticate the local device, e.g., to verify that the local device has the password. The password management entity may enable the login if the local device is authenticated. In some applications, a challenge-response protocol may include sending a challenge from the password management entity to the local device. The local device may encrypt the challenge obtained from the password management entity with a hash of the password and send the encrypted challenge to the password management entity. The password management entity may also encrypt the challenge with the saved hashed password and compare or otherwise verify the resultant encrypted challenge with the encrypted challenge obtained from the local device.

According to embodiments of the invention, a dedicated service, server or application referred to herein as authentication service or identity provider (IdP), may provide a password, a temporary password or a onetime password (OTP), referred to herein uniformly as a password, for the login process. The local device may communicate with the authentication service over a network, e.g., the internet.

When communication exists between the local device and the authentication service, the login process may be referred to herein as an online login. In an online login process, a user may provide a username to the local device and the password may be provided by the authentication service to the local device and to the password management entity. The password management entity may use any challenge response or other protocol to verify the identity of the user (e.g., authenticate the user) using or with relation to the password provided by the authentication service. For example, the local device may send a data item that is based on or a function of the password, and may prove that the local device has the password, e.g., a challenge signed with the password.

According to embodiments of the invention, in an online login the authentication service may authenticate the user using any applicable authentication protocol. In some embodiments the authentication protocol may include using a second device, physically separated from the local device, or internal to local device, to verify the identity of the user. The authentication service may provide the password to the local device and the password management entity only if the identity of the user is verified. The authentication service may keep a password database, also referred to herein as a database vault, for storing user passwords.

For example, according to embodiments of the invention, passwords are generated or created and provided to the local device and to the password management entity by an authentication service instead of obtaining the passwords from the user. Once the user needs to log in, the authentication service may send the password to the local device. In that case, the passwords cannot be hashed since the local device may have to assign the password in its clear form as if it was the user typing the password.

According to embodiments of the invention, the authentication service may store an encrypted version of the user passwords in a password database, also referred to herein as a password vault. Once encrypted, the encrypted passwords may not be decrypted by any device other than the local device associated with (e.g., owning, using, or accessible using) the password. According to embodiments of the invention, neither the password management entity nor the authentication service may have the keys for decrypting the encrypted passwords. According to some embodiments, the authentication service may encrypt the passwords using public keys provided by the local devices. The authentication service may not have possession of the corresponding private keys. Keys may be electronic cryptographic data structures. Therefore, the authentication service, or any malicious entity that may break into the authentication service, may not be able, even theoretically, to decrypt the encrypted passwords stored in the password vault. Therefore, embodiments of the present invention may improve the technology of password storage and management by providing a decentralized password vault where passwords are stored encrypted and the keys for decrypting the passwords are decentralized, e.g., distributed among the devices associated with the user. Thus, embodiments of the invention may provide a method for performing secure password storage and management.

Embodiments of the invention may rely on private-public key cryptography. Private-public key cryptography requires a pair of matching keys including a private key and a matching public key. When using a pair of matching private key and public key, a string of characters, e.g., a password, encrypted with the public key, may be decrypted correctly only when the matching private key is used.

According to embodiments of the invention, a pair of matching private-public keys, may be used to secure the password sent by the authentication service to the local device. The private key may be owned by the local device, and the matching public key may be provided by the local device to the authentication service, e.g., at startup or at registration or login, or whenever required by the application. Thus, when the authentication service generates a password for the user (in some embodiments a password may be generated for each user, the password may be used by the user to login to a plurality of devices that are associated with the user), the authentication service may first encrypt the password, using the public key of the local device. When required, the authentication service may send the encrypted password to the local device. The local device may decrypt the encrypted password using the matching private key to obtain the decrypted or clear password.

An offline login may refer to a login process that takes place when there is no communication between the local device and the authentication service or the password management entity, or when the authentication service or the password management entity are unavailable. An offline login may happen, for example, if the authentication service, the password management entity, or the local device are offline or disconnected from the network (the internet or the organization network), or if the authentication service or the password management entity are not available for performing the login process for any other reason.

According to embodiments of the invention, each device that is registered with the authentication service or needs to log in to the password management entity may send its public key to the authentication service and the authentication service may encrypt the password of the user with this public key. This implies that if there are n devices associated with a specific user (registered devices or devices the user uses to log in to the password management entity), the user's password may be encrypted by n different public keys and therefore n versions of the encrypted password may be saved in the password database of the authentication service. The encryption process may be repeated when the password is updated (for any reason) and therefore the password must be re-encrypted by all public keys of registered devices. For example, the password is updated when a new device is registered for a specific user, on the first login to the password management entity after the registration, or after a predefined time period. In the latest case, since the authentication service does not hold the password itself, and thus cannot encrypt the password with the public key of the new registered device, a new password may be generated and encrypted with all the public keys, the public key of the new device and all other existing public keys of previously registered devices.

Once the user needs to log in to a service via the local device, the user may obtain an encrypted password to their local device, the local device may decrypt the encrypted password with the corresponded private key and use the plain (e.g. unencrypted) password to complete authentication to the password management entity.

Reference is made to FIG. 1, which is a system 100 according to embodiments of the invention. According to some embodiments, local device 110, user device 120, new device 190, e.g., a device that is not associated with the user or is not registered yet, authentication service 130, password management entity 160, and other devices 180 may include components of computing device 700. System 100 may include devices associated with a user such as local device 110, user device 120 and other devices 180 associated with the user, authentication service 130 and a password management entity 160. While FIG. 1 presents devices associated with a single user, this is done for simplicity only and system 100 may include a plurality of devices associated with a plurality of users.

Network 150 may include any type of network or combination of networks available for supporting communication between local device 110, password management entity 160, user device 120, authentication service 130, and other devices 180. Network 150 may include for example, a wired, wireless, fiber optic, or any other type of connection, a local area network (LAN), a virtual private network (VPN), a wide area network (WAN), the Internet and intranet networks, etc. According to some embodiments, permission management service 160 and authentication service 130 may have a direct link between them, or may be connected through a local or private network, e.g., a LAN or WAN networks.

Each of local device 110, user device 120 and other devices 180 may be a computing device associated with a user. Local device 110 may execute an agent software or application, e.g., a client API. Each of local device 110, user device 120 and other devices 180 may be connected to network 150. Local device 110 may be locked, e.g., access of users to local device 110 may be prevented, unless the user logs in to local device 110. According to embodiments of the invention, to perform the login, the user has to provide his username only to local device 110, e.g., to client API. In contrast to many other systems, according to embodiments of the invention, the user does not have to provide a password. Instead, the identity of the user may be verified, e.g., by user device 120, and authentication service 130 may provide the password, as disclosed herein. To complete the login process local device 110 may send the password obtained from authentication service 130 to password management entity 160, or follow any other authentication protocol with management entity 160.

User device 120 may be a device external to local device 110 (e.g., physically separated from local device 110) or internal to local device 110, that may be used to authenticate or verify an identity of the user, and to provide a password for offline login. User device 120 may be or may include for example, a mobile smartphone operating an authentication application or an embedded biometric module with authentication capabilities (embedded for example in local device 110), e.g., an embedded fingerprint module. User device 120 may verify the identity of the user using any applicable method, e.g., using a pin code, or by performing biometric authentication using at least one of a fingerprint, a facial pattern, an iris pattern, a retinal pattern, voice authentication, etc. Additionally or alternatively, user device 120 may authenticate or verify an identity of the user by communicating with an external token over, e.g., Bluetooth Low Energy (BLE), universal serial bus (USB), Near Field Communication (NFC) etc. USB, BLE or NFC. User device 110 may be used for authentication the user to implement double-factor authentication. In applications using only a single-factor authentication, user device 120 may be not be required to authenticate the user. User device may have a direct line of communication with local device, e.g., using Bluetooth Low Energy (BLE), universal serial bus (USB), Near Field Communication (NFC) etc.

Authentication service or IdP 130 may be responsible of validating the user and generating a password 132 for the user. Authentication service 130 may be connected to password database or password vault 140. According to embodiments of the invention, authentication service 130 may not store a plain or clear (e.g., unencrypted) form of the generated passwords 132 in password vault 140. Instead, authentication service 130 may encrypt the password 132, using one or more encryption keys 114, 184, and store one or more versions of the encrypted passwords 136, 186, each version encrypted with a different encryption key 114, 184, as disclosed herein.

According to embodiments of the invention, authentication service 130 may obtain or receive one or more public keys 114, 184. Authentication service 130 may obtain a public key 114, 184 from, owned or associated with each of the devices associated with the user, also referred to as registered devices, e.g., for each of the devices the user needs a password to log in to and user devices. For example, authentication service 130 may obtain a public key from each of local device 110, user device 120 and other devices 180. According to embodiments of the invention, authentication service 130 may encrypt password 132 several times, each time using one of public keys 114, 184, thus generating a plurality of encrypted passwords 136, 186. Each of the encrypted passwords 136, 186 may be associated with a specific device (e.g., one of local device 110, user device 120 or any one of other devices 180) and encrypted with a single public key 114, 184 that is associated with (e.g., provide by) the specific device. For example, authentication service 130 may obtain public key 114 from local device 110 and use public key 114 to encrypt the password 132, thus creating or generating an encrypted password 136 for local device 110, and thus for the user associated with or owning the local device. Similarly, authentication service 130 may obtain public keys 184 from other devices 180 and local device 110, e.g., a single public key 184 from each of other devices 180 and local device 110, and use each of public keys 184 to encrypt the password 132, thus creating or generating a plurality of encrypted passwords 186, each for one of other devices 180 and local device 110.

According to embodiments of the invention, authentication service 130 may delete, remove and/or not store the clear version of the password 132. Instead, authentication service 130 may store all the encrypted versions of the user passwords 136, 186 in password vault 140. When the user logs in to or authenticates on local device 110, local device 110 may send an authentication or login request to authentication service 130. In response, authentication service 130 may send an encrypted password 136 (encrypted with public key 114 associated with local device 110) to local device 110. Local device 110 may decrypt encrypted password 136 using the corresponding private key 112, and send or transmit the decrypted (e.g., clear) password to password management entity 160 or follow any other applicable protocol to enable password management entity 160 to verify the password of the local device 110. For example, local device 110 may send to password management entity 160 a data item that is based on or a function of the password, where the data item may prove to password management entity 160 that local device 110 has the password. For example, local device 110 may obtain a challenge from password management entity 160 and send back a challenge signed with the password.

Each of password databases 140 and 170 may be a storage device (e.g., storage 730 depicted in FIG. 8) used for storing user passwords and any other data, as required by the application.

Password management entity 160 may be a service or an application for managing access permissions to networked resources, e.g., to local device 110, and to authenticate users that require access the resources. Password management entity 160 may be connected to password database 170. Password management entity 160 may obtain a password 132 associated with the user from authentication service 130. According to embodiments of the invention, when a user logs in to local device 110, password management entity 160 may obtain password 132 associated with the user from authentication service 130. Password management entity 160 may use any applicable protocol to verify the password of the local device 110 using password 132 obtained from authentication service 130, e.g., a challenge-response or other protocol may be used. By verifying the password, management entity 160 may authenticate local device 110. For example, in its simplest form, the response may include the password itself that may be compared with password 132 obtained from authentication service 130. In some applications, the challenge-response protocol may include sending a challenge from password management entity 160 to the local device 110. Local device 110 may encrypt the challenge obtained from password management entity 160 with a hash of the password and send the encrypted password to password management entity 160. Password management entity 160 may also encrypt the challenge with the saved hashed password (obtained from authentication service 130) and compare the resultant encrypted challenge with the encrypted challenge obtained from local device 110. In case of a match, the password is verified, local device 110 is authenticated and the login is approved. If there is no match, the login request is refused. Password management entity 160 may store user passwords, clear or hashed, in password database 170.

According to embodiments of the invention, authentication service 130 may repeat the encryption process if password 132 is updated. For example, authentication service 130 may change password 132 according to a customer policy, e.g., once a day, once a week, etc. If password 132 is updated, authentication service 130 may re-encrypt the new password by all public keys 114, 184 of the registered devices, e.g., local device 110, user device 120 and other devices 180. Authentication service 130 may generate a new password for a user and repeat the encryption process, if a new device 190 is registered for the user. If new device 190 is registered for the user, new device 190 may provide a public key to authentication service 130. Authentication service 130 may have to encrypt password 132 associated with the user with the public key of new device 190. However, this may not be possible since authentication service 130 may not hold password 132 itself in clear from, and thus cannot encrypt password 132 with the public key of new device 190. Furthermore, authentication service 130 does not have any of the private keys required for decrypting the encrypted passwords 136, 186. Therefore, authentication service 130 may generate a new password and encrypt the new password with all the public keys of the registered devices, including public key 114 of local device 110, the public key of user device 120, the public keys 184 of other devices 180 and the public key of new device 190. Authentication service 130 may provide the new password in clear form to password management entity 160.

Embodiments of a method for secure password management may include a secure password generation and performing an online login and offline login. Embodiments of a method for secure password management will be now demonstrated with relation to FIGS. 2-4.

Figure 2:
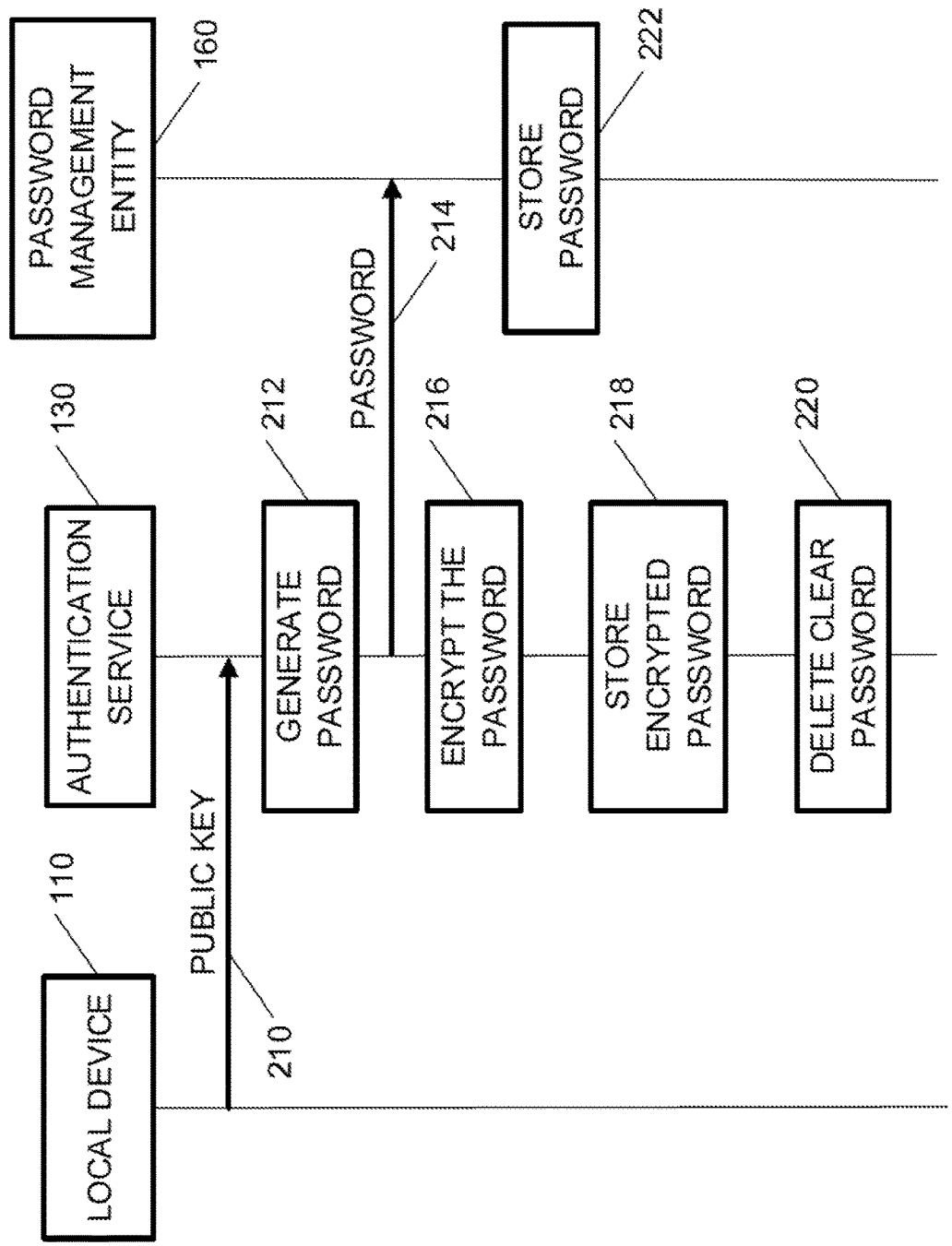
FIG. 2 is a flowchart of a method for secure password generation, according to embodiments of the invention.

Reference is made to FIG. 2, which is a flowchart of a method for secure password generation, according to embodiments of the invention. An embodiment of a method for a secure password generation may be performed, for example, by the systems shown in FIGS. 1 and 8. An embodiment of a method for secure password generation may be performed as part of an online login process.

In operation 210, local device 110 may send a public key 114 to authentication service 130. According to embodiments of the invention, authentication service 130 may obtain public key 114, as well as a plurality of other public keys 184, each from one of a plurality of devices associated with a user, e.g., from each of user device 120 and other devices 180. In operation 212, authentication service 130 may generate a password 132 for the user. For example, a single password 132 may be generated for each registered user, and the system may use the same password 132 to log in the user to each of the devices associated with the user. However, this is not mandatory, and a user may be assigned with more than one password, according to system configuration. In operation 214, authentication service 130 may send the password 132 (e.g., the clear password or using any other applicable format) of the user to password management entity 160. In operation 222, password management entity 160 may store the password, clear or hashed, or using any other applicable format, as determined by the application.

In operation 216, authentication service 130 may encrypt password 132 several times, each time with one of public keys 114, 184, thus generating a plurality of encrypted passwords 136, 186, each associated with a device of the plurality of devices. For example, authentication service 130 may encrypt the password with public key 114 to generate an encrypted password 136 associated with the user and with local device 110. Authentication service 130 may encrypt password 132 with each of the other public keys 184 to generate an encrypted password 186 associated with the user and with each of user device 120 and other devices 180. Thus, a plurality of encrypted passwords 136, 186 may be generated for each user, each of the passwords 136, 186 associated with (e.g., enables log in to) a one or more local devices associated with the user (e.g., devices that the user may log in to according to system configuration).

In operation 218, the plurality of the encrypted passwords 136, 186 may be stored in password database or password vault 140. In operation 220, authentication service 130 may delete the clear password 132. Thus, apart from the time since password 132 has been generated (operation 212) and until right after password 132 has been sent to password management entity 160, authentication service 130 may not save, store, hold or have access to the clear password 132. Furthermore, authentication service 130 may not be able to reconstruct the clear password 132, since decrypting the encrypted password 136, 186 would require the corresponding private key, which is not provided to authentication service 130. Thus, neither the authentication service 130 itself, nor any malicious entity breaking into authentication service 130, may be able, even theoretically, to reconstruct the clear password 132 after the registration process is complete, e.g., following operation 220.

Embodiments of a method for secure password generation may repeat for each new device that is added to system 100, for a new or existing user. For example, if a new device, e.g., new device 190 is added to the same user associated with local device 110, new device 190 may send a request to associate new device 190 (e.g., enable the user to log in to new device 190) with the user to authentication service 130. The request may include a username of the user, and any other user credentials and details required by the application, and a public key of new device 190. Authentication service 130 may obtain the request, similarly to operation 210.

Afterwards, when a log in is performed to any device that is associated with or owned by the user, e.g., to local device 110, new device or any one of other devices 180, authentication service 130 may generate a new password to the user and repeat operations 212-220. This may be required since authentication service 130 cannot in some embodiments simply encrypt the existing password 132 with the public key of new device 190. Authentication service 130 cannot in some embodiments encrypt the existing password 132 with the public key of new device 190 since authentication service 130 does not have a copy of the clear password 132, as the clear password 132 have been deleted in operation 220. In addition, Authentication service 130 cannot in some embodiments decrypt any of the encrypted passwords 136, 186 since decrypting each of the encrypted passwords 136, 186 would require the corresponding private key which authentication service 130 does not have. Similarly, operations 212-220 may be repeated whenever a new password is generated for any of the devices associated with the user, e.g., if a request to change the password of the user is obtained at authentication service 130.

Figure 3:
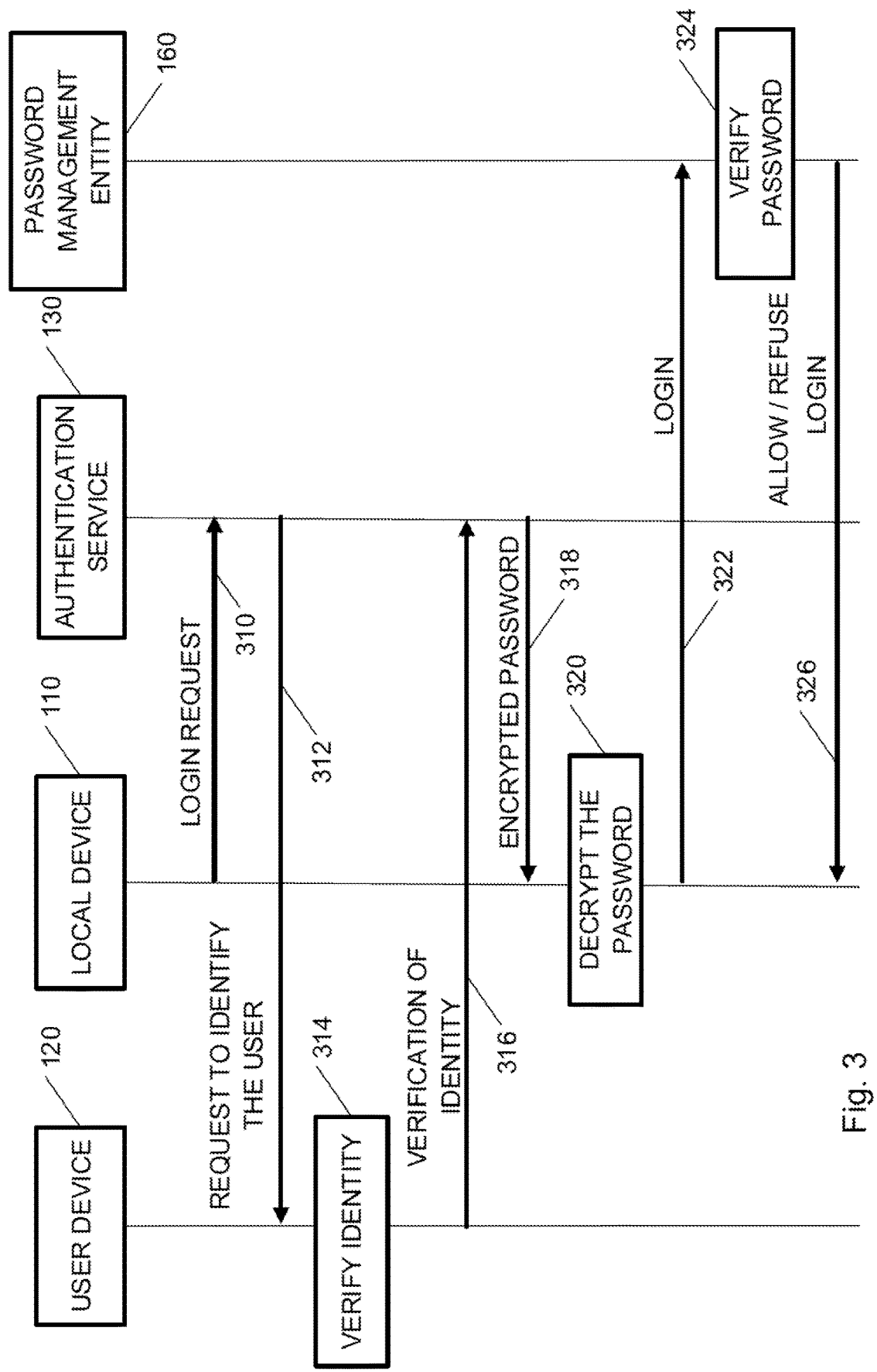
FIG. 3 is a flowchart of a method for performing an online login, according to embodiments of the invention.

Reference is made to FIG. 3, which is a flowchart of a method for performing an online login, according to embodiments of the invention. An embodiment of a method for performing an online login may be performed, for example, by the systems shown in FIGS. 1 and 5. An embodiment of a method for performing an online login may take advantage of the secure password management disclosed herein.

In operation 310, local device 110 may send a login request to authentication service 130. The login request may include a username and other details, or user credentials as required by the application. The login request and username may be obtained at local device 110, e.g., client API, from a user wishing to log in to local device 110 and forwarded to authentication service 130. According to embodiments of the invention, the user may not be required to provide a password to log in. Instead, authentication service 130 may provide or generate the password 132 (e.g., the password generated in operation 212 and encrypted in operation 216), possibly subject to identification of the user. In operation 312, authentication service 130 may send a request to identify the user to an authentication device or module, physically separated or internal to local device 110, that is associated with the same user. For example, authentication service 130 may send a request to identify the user to user device 120.

In optional operation 314, user device 120 may verify the identity of the user using any applicable method. For example, user device 120 may verify the identity of the user by obtaining a "PIN" code from the user and comparing the obtained pin code with a stored PIN code, and/or by performing biometric authentication using at least one of a fingerprint, a facial pattern, an iris pattern, a retinal pattern, voice authentication, etc. In some embodiments, the presence or communication with user device 120 may verify the identity of the user. In operation 316, user device 120 may confirm that the identity of the user has been verified to authentication service 130.

In operation 318, authentication service 130 may send the encrypted password 136 associated with local device 110, e.g., the password encrypted with public key 114, to local device 110. Possibly, operation 318 may be performed only after obtaining verification of the identity from user device 120. Local device 110 may obtain the encrypted password 136 and, in operation 320, decrypt the encrypted password 136 using private key 112 associated with public key 114 of local device 110, to obtain the decrypted password. At this stage, local device 110 may use the decrypted password to perform the login. For example, in operation 322, local device 110 may initiate a login by providing the username and any other required details to password management entity 160. Password management entity 160 may already have the clear or hashed password 132 associated with the user, obtained from authentication service 130 in operation 214. In operation 324, password management entity 160 may authenticate the local device 110, e.g., verify that local device 110 has the password, with relation to the clear password 132 obtained from authentication service 130, e.g., using a challenge-response or any other applicable authentication protocol. For example, local device 110 may send to password management entity 160 a data item that is based on or a function of the password, where the data item may prove to password management entity 160 that local device 110 has the password. For example, local device 110 may obtain a challenge from password management entity 160 and send back a challenge signed with the password. In operation 326, password management entity 160 may allow or refuse the login based on the verification. For example, password management entity 160 may allow the login if the two passwords match and refuse the login request if is the two passwords differ.

Figure 4:
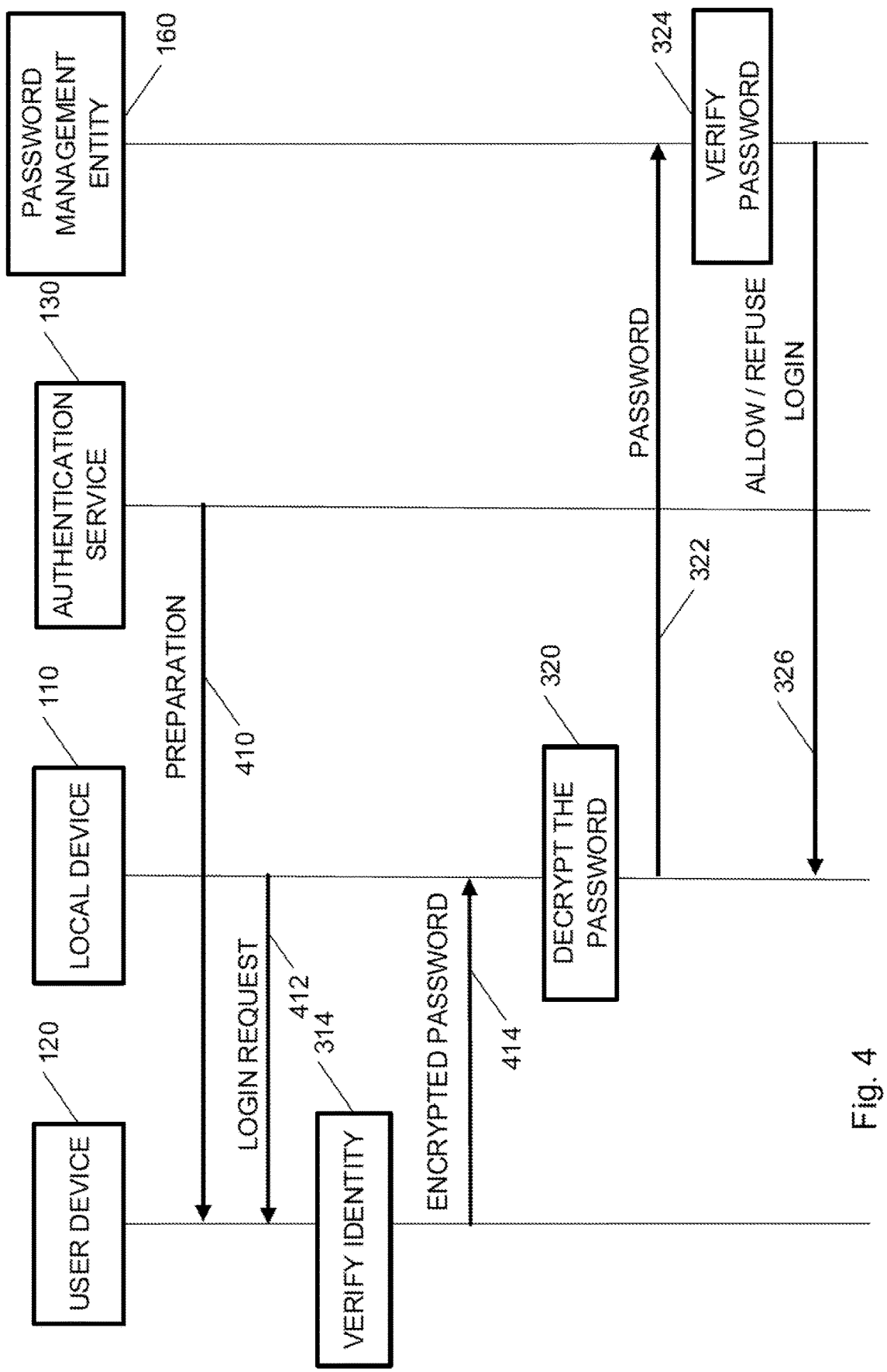
FIG. 4 is a flowchart of a method for performing an offline login, when there is no communication between the local device and the authentication service, according to embodiments of the invention.

Reference is made to FIG. 4, which is a flowchart of a method for performing an offline login, when there is no communication between local device 110 and the authentication service 130, according to embodiments of the invention. An embodiment of a method for performing an offline login may be performed, for example, by the systems shown in FIGS. 1 and 8. An embodiment of a method for performing an offline login may be performed when the user wishes to log in to local device 110 and authentication service 130 is offline, e.g., when there is no communication between local device 110 and authentication service 130, or when the user wishes to log in to local device 110 and local device 110 is not connected to network 150. Some of the operations required for performing an offline login are similar to operations required for performing an online login; those operations will be given the same reference numerals.

Performing an offline login may require a preparation step 410 that may be performed while authentication service 130 is online. In the preparation stage 410 of some embodiments, authentication service 130 may send the password encrypted 136 with public key 114 to user device 120.

In some embodiments, however, authentication service 130 may send at least two versions of encrypted password to user device 120, the password encrypted with a public key of user device 120 and the password 136 encrypted with public key 114. In case system 100 includes a plurality of local devices 110, a plurality of encrypted passwords 136, 186, each associated with a single local device, may be send to user device 120, e.g., for each local device in system 100, an encrypted password 136, 186 encrypted with the public key of the associated local device may be sent to user device 120. Alternatively, authentication service 130 may send the password encrypted with a public key of user device 120 and public key 114 (or a public key for each local device). In this case, user device 120 may decrypt the password encrypted with a public key of user device 120 using the corresponding private key of user device 120 to obtain the clear password, and encrypt the clear password using public key 114 to obtain the password encrypted with public key 114.

To perform the offline login in case there is communication between user device 120 and local device 110, in operation 412, local device 110 may send a login request to user device 120. For example, the request to log in may be obtained at local device 110 from the user, e.g., the user may type a username in the client API. User device 120 may verify the identity of the user as disclosed herein in operation 314. If the identity of the user is successfully identified in operation 314, then in operation 414, user device 120 may send the encrypted password associated with local device 110 (obtained or generated by user device 120 in the preparation stage 410) to local device 110. If the identity of the user is not successfully identified in operation 314 (e.g., unsuccessful identification), user device 120 may not send the encrypted password associated with local device 110 to local device 110. In operation 320, local device 110 may decrypt the encrypted password using private key 112 associated with public key 114 of user device 120, to obtain the decrypted password. At this stage, local device 110 may use the decrypted password to perform the login locally (e.g., as presented in FIG. 5), or as indicated in operations 322-326.

Figure 5:
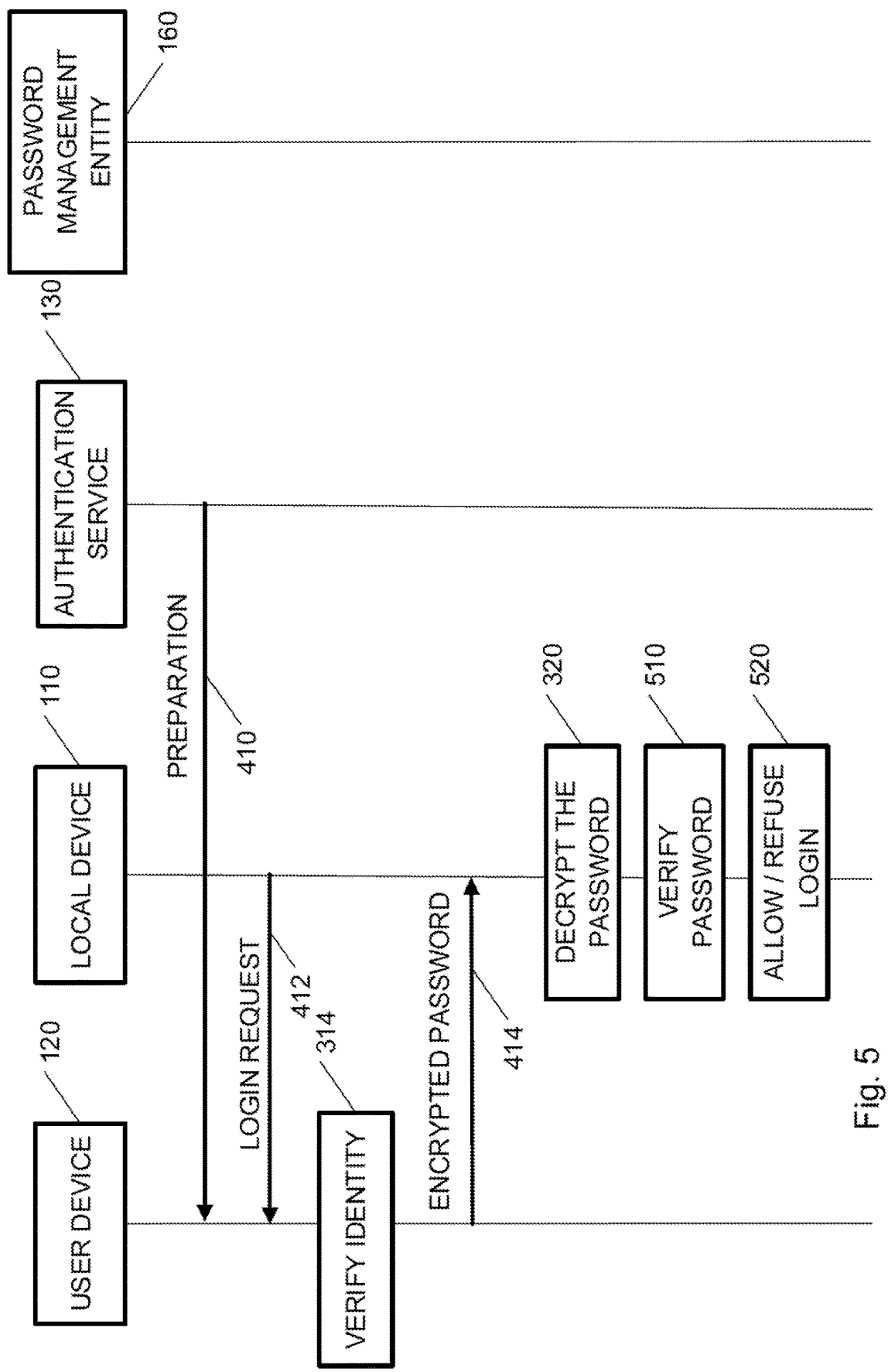
FIG. 5 is a flowchart of a method for performing an offline login, when there is no communication between the local device and both the authentication service and the password management entity, according to embodiments of the invention.

FIG. 5 presents a flowchart of a method for performing an offline login where there is no communication between local device 110 and both authentication service 130 and password management entity 160, according to embodiments of the invention. embodiments of the method presented in FIG. 5 are generally similar to the embodiments presented in FIG. 4. However, since there is no communication between local device 110 and password management entity 160, local device 110 may verify the password locally in operation 510, and may allow or refuse the login based on the verification in operation 520.

Figure 6:
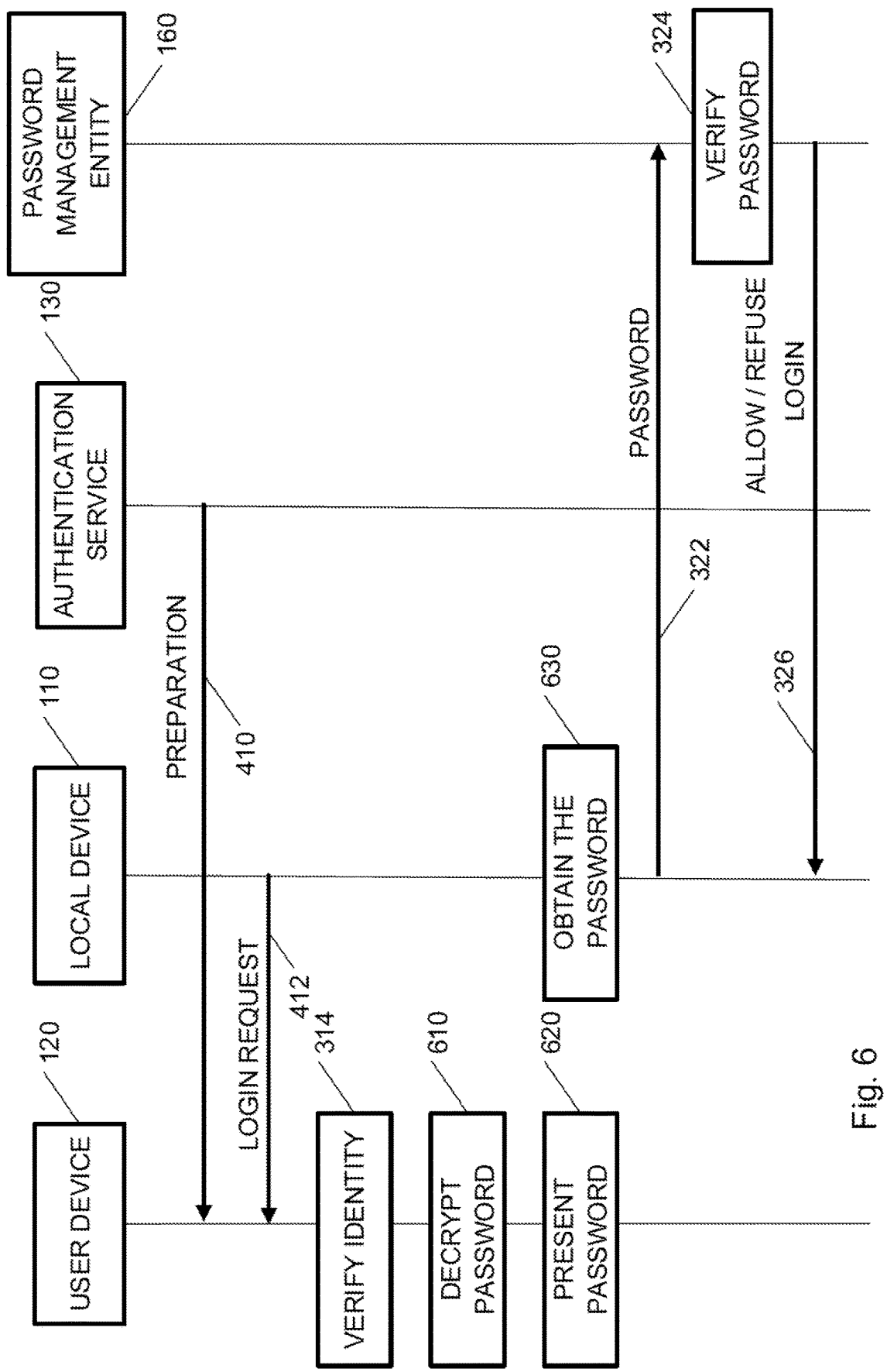
FIG. 6 is a flowchart of a method for performing an offline login when there is no communication between the local device and both the user device and the authentication service, according to embodiments of the invention.

Reference is made to FIG. 6, which is a flowchart of a method for performing an offline login when there is no communication between local device 110 and both user device 120 and authentication service 130, according to embodiments of the invention. Embodiments of the method presented in FIG. 6 may include similar operations as the embodiments of the method presented in FIG. 4, similar operations may not be described again. If there is no communication between user device 120 and local device 110, and a user tries to log in to local device when local device 110 is offline, then the user may have to provide the password to local device 110. However, since the password was generated by authentication service 130 and sent encrypted to the devices associated with the user, the user does not have the password. Thus, in operation 610 user device 120 may decrypt the password that is encrypted with the public key of user device 120, using a corresponding private key of user device 120 to obtain a clear password. In operation 620 user device 120 may present the clear password to the user who may type the password to local device 110. In operation 630, local device may obtain the decrypted password to perform a the login locally, or as indicated in operations 322-326.

Figure 7:
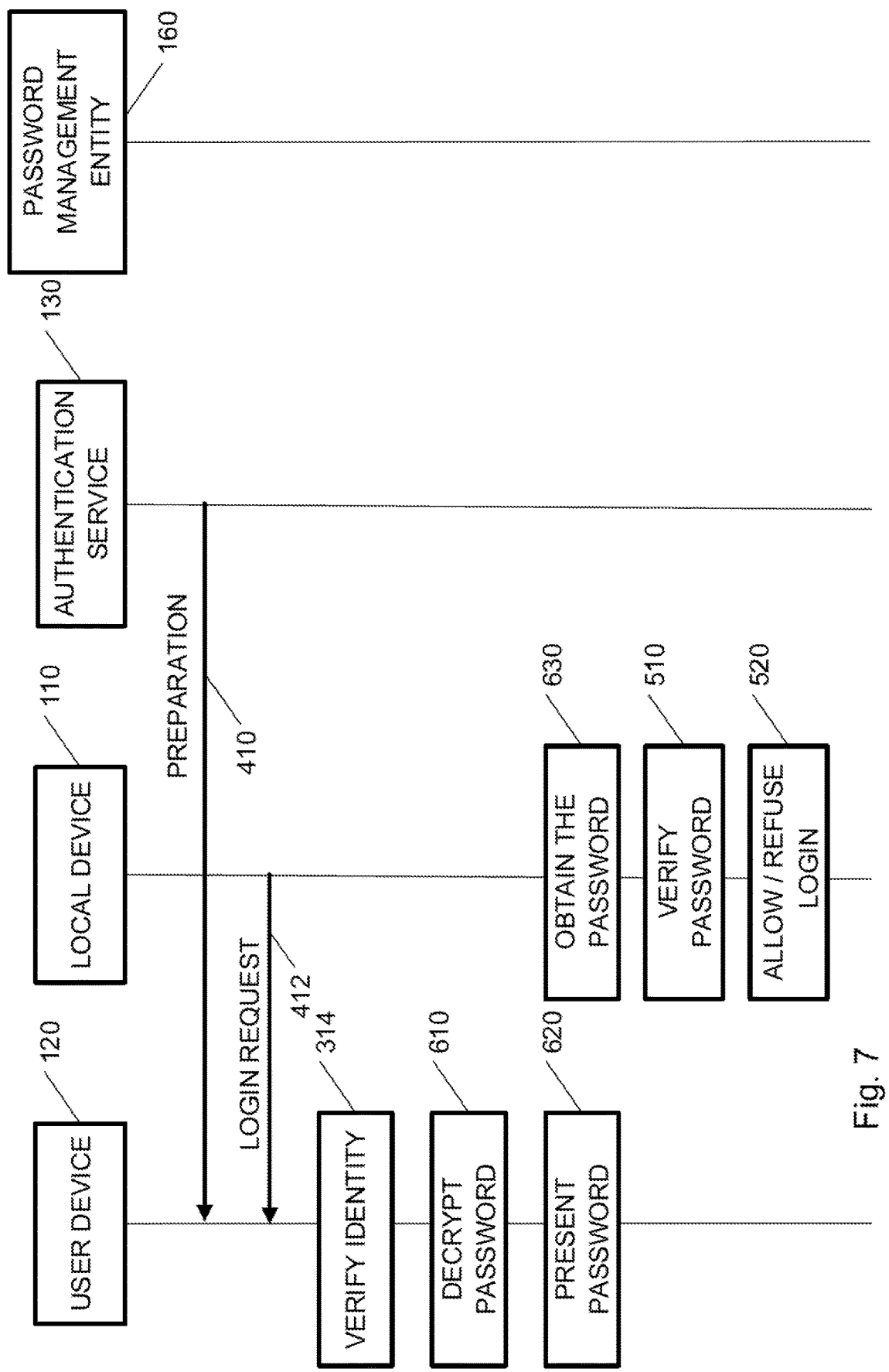
FIG. 7 is a flowchart of a method for performing an offline login when there is no communication between the local device and the user device, the password management entity, and the authentication service, according to embodiments of the invention.

FIG. 7 presents a flowchart of a method for performing an offline login where there is no communication between local device 110 and user device 120, authentication service 130 and password management entity 160, according to embodiments of the invention. embodiments of the method presented in FIG. 7 are generally similar to the embodiments presented in FIG. 5. However, since there is no communication between local device 110 and password management entity 160, local device 110 may verify the password locally in operation 510, and may allow or refuse the login based on the verification in operation 520.

Figure 8:
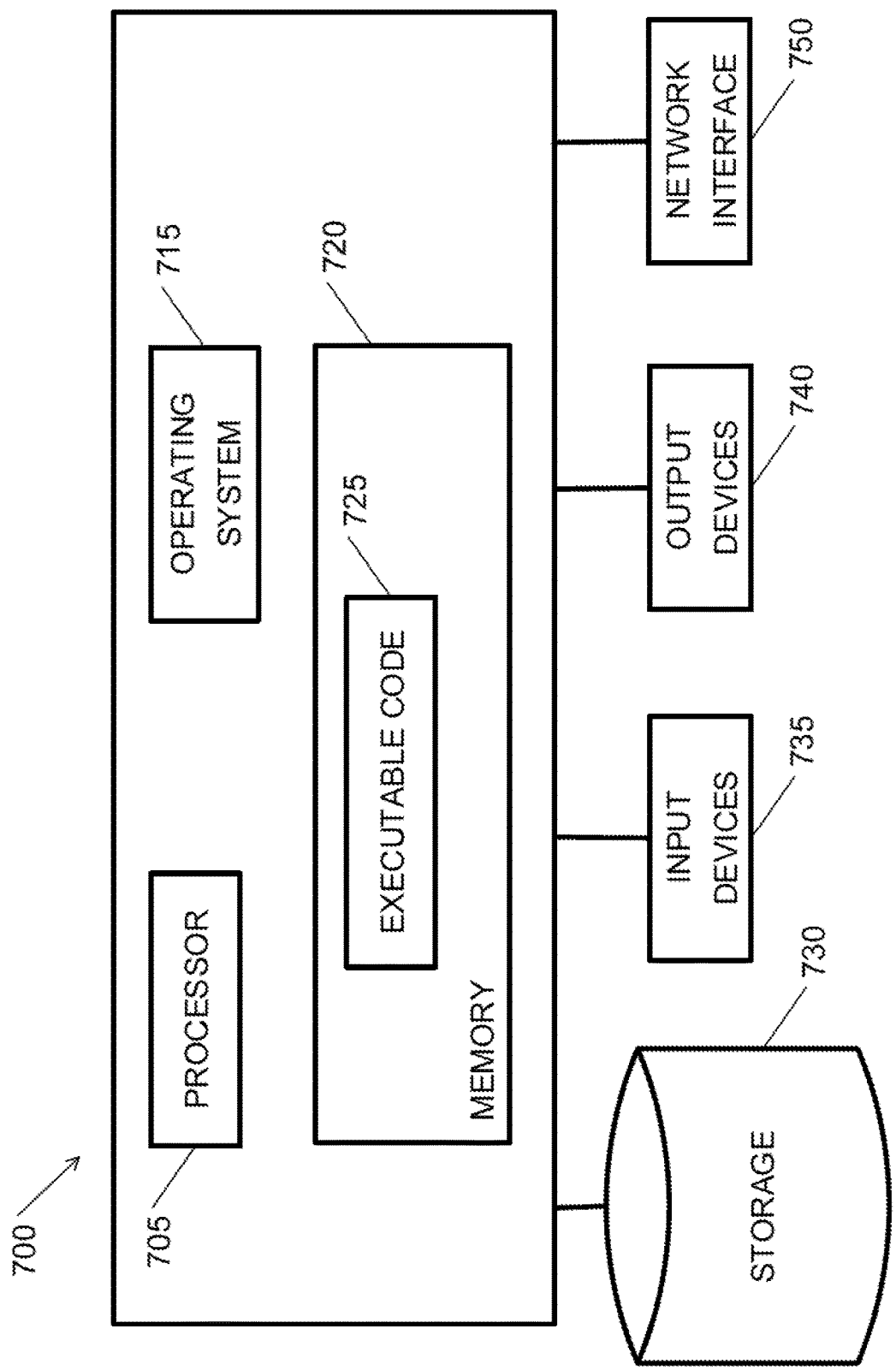
FIG. 8 illustrates an example computing device according to an embodiment of the invention.

FIG. 8 illustrates an example computing device according to an embodiment of the invention. Various components such as local device 110, user device 120, other devices 180, new device 190, authentication service 130, and password management entity 160 and other modules, may be or include, or be executed by, computing device 700, or may include components such as shown in FIG. 8. For example, a first computing device 700 with a first processor 705 may be used to secure passwords including a registration process and performing an online login and offline login, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Operating system 715 may be or may include any code segment designed and/or configured to provide a virtual machine, e.g., an emulation of a computer system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of possibly different memory units.

Executable code 725 may be any executable code, e.g., an application, a program, a process, task or script. Executable code 725 may be executed by processor 705 possibly under control of operating system 715. For example, executable code 725 may be or include software for performing secure password management including a registration process and performing an online login and offline login, according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a USB device or other suitable removable and/or fixed storage unit. Storage 730 may include or may store one or more databases 140 and 170, In some embodiments, some of the components shown in FIG. 8 may be omitted. For example, memory 720 may be a non-volatile memory having the storage capacity of storage 730. Accordingly, although shown as a separate component, storage 730 may be embedded or included in memory 720. Database 140 and 170 may be at least partially implemented by one or more remote storage devices 730 (e.g., in the "cloud").

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for securing passwords, the method comprising:

obtaining, by an authentication service, a plurality of public keys, each public key of the plurality of public keys associated with one of a plurality of devices associated with a user;

generating, by the authentication service, a password for the user;

sending, by the authentication service, the password to a password management entity;

encrypting, by the authentication service, the password with each of the public keys, thus generating a plurality of encrypted passwords, each encrypted password of the plurality of encrypted passwords encrypted with one of the public keys and associated with a device of the plurality of devices; and deleting the password by the authentication service.

2. The method of claim 1, comprising:

obtaining, at the authentication service from a first device, a request to log in the user to the first device; and sending to the first device, by the authentication service, the encrypted password associated with the first device.

3. The method of claim 2, comprising:

obtaining, at the first device, the encrypted password associated with the first device;

decrypting, at the first device, the encrypted password using a private key associated with the public key of the first device, to obtain the decrypted password; and using, by the first device, the decrypted password to perform the login.

4. The method of claim 3, comprising:
sending, by the authentication service, the password to a password management entity;
verifying, by the password management entity, the local device using the password obtained from the authentication service; and
allowing the login, by the password management entity, only if the decrypted password is verified.

5. The method of claim 1, comprising:
prior to sending the encrypted password associated with the first device, sending, by the authentication service, to a second device associated with the user, a request to identify the user; and
obtaining verification of the identity from the second device.

6. The method of claim 1, comprising:
obtaining, at the authentication service, a request to associate with the user a third device that is not one of the plurality of devices, and a public key of the third device;
generating, by the authentication service, a new password for the user;
sending, by the authentication service, the new password to the password management entity;
encrypting, by the authentication service, the new password with each of the public keys and with the public key of the third device, thus generating a plurality of new encrypted passwords, each associated with a device of the plurality of devices and with the new device; and
deleting the new password by the authentication service.

7. The method of claim 1, comprising:
obtaining, at the authentication service, a request to change the password of the user;
generating, by the authentication service, a new password for the user;
sending, by the authentication service, the new password to the password management entity;
encrypting, by the authentication service, the new password with each of the public keys, thus generating a plurality of new encrypted passwords, each associated with a device of the plurality of devices; and
deleting the password by the authentication service.

8. The method of claim 1, comprising:
in a preparation stage, sending, to a second device associated with the user, by the authentication service, the encrypted password associated with the first device;
performing a login to the first device when the authentication service is off-line by:
sending from the first device to the second device a request to login the user to the first device;
verifying the identity of the user by the second device;
following a successful identification of the user, sending the encrypted password associated with the first device from the second device to the first device;
decrypting, at the first device, the encrypted password using a private key associated with the public key of the first device, to obtain the decrypted password; and
using the decrypted password to perform the login.

9. The method of claim 1, comprising:
in a preparation stage, sending, to a second device associated with the user, by the authentication service, the encrypted password associated with the second device and the public key of the first device;
performing a login to the first device when the authentication service is off-line by:
sending from the first device to the second device a request to log in the user to the first device;
verifying the identity of the user by the second device;
following a successful identification of the user:
decrypting, by the second device, the encrypted password associated with the second device to obtain a clear password;
encrypting, by the second device, the clear password with the public key of the first device to obtain the encrypted password associated with the first device;
sending the encrypted password associated with the first device from the second device to the first device;
decrypting, at the first device, the encrypted password using a private key associated with the public key of the first device, to obtain the decrypted password; and
using the decrypted password to perform the login.

10. The method of claim 1, comprising:
in a preparation stage, sending, to a second device associated with the user, by the authentication service, the encrypted password associated with the second device;
performing a login to the first device when the authentication service is off-line by:
decrypting, by the second device the encrypted password associated with the second device;
verifying the identity of the user by the second device;
following a successful identification of the user, presenting the decrypted password to the user;
obtaining, at the first device, the decrypted password from the user; and
using the decrypted password to perform the login.

11. A system for securing passwords, the system comprising:
a memory; and
a processor configured to:
obtain a plurality of public keys, each public key of the plurality of public keys associated with one of a plurality of devices associated with a user;
generate a password for the user;
send the password to a password management entity;
encrypt the password with each of the public keys, thus generating a plurality of encrypted passwords, each encrypted password of the plurality of encrypted passwords encrypted with one of the public keys and associated with a device of the plurality of devices; and
delete the password.

12. The system of claim 11, comprising:
a first device;
wherein the processor is configured to:
obtain from the first device, a request to log in the user to the first device; and
send to the first device the encrypted password associated with the first device.

13. The system of claim 12, wherein the first device is configured to:
obtain the encrypted password associated with the first device;
decrypt the encrypted password using a private key associated with the public key of the first device, to obtain the decrypted password; and
use the decrypted password to perform the login.

14. The system of claim 13, comprising:
a password management entity;
wherein the processor is configured to send the password to the password management entity;
wherein the password management entity is configured to:
verify the local device using the password obtained from the processor; and
allow the login only if the decrypted password is verified.

15. The system of claim 11, comprising:
a second device;
wherein the processor is configured to:
prior to sending the encrypted password associated with the first device, send to a second device associated with the user, a request to identify the user; and
obtain verification of the identity from the second device.

16. The system of claim 11, wherein the processor is configured to:
obtain a request to associate with the user a third device that is not one of the plurality of devices, and a public key of the third device;
generate a new password for the user;
send the new password to the password management entity;
encrypt the new password with each of the public keys and with the public key of the third device, thus generating a plurality of new encrypted passwords, each associated with a device of the plurality of devices and with the new device; and
delete the new password.

17. The system of claim 11, wherein the processor is configured to:
obtain a request to change the password of the user;
generate a new password for the user;
send the new password to the password management entity;
encrypt the new password with each of the public keys, thus generating a plurality of new encrypted passwords, each associated with a device of the plurality of devices; and
deleting the password.

18. The system of claim 11, comprising:
a first device; and
a second device associated with the user;
wherein the processor is configured to send to the second device the encrypted password associated with the first device in a preparation stage;
wherein the first device is configured to perform a login to the first device when the processor is off-line by sending to the second device a request to login the user to the first device;
wherein the second device is configured to:
verify the identity of the user; and
following a successful identification of the user, send the encrypted password associated with the first device from the first device;
wherein the first device is configured to:
decrypt the encrypted password using a private key associated with the public key of the first device, to obtain the decrypted password; and
use the decrypted password to perform the login.

19. The system of claim 11, comprising:
a first device; and
a second device associated with the user;
wherein the processor is configured to send, in a preparation stage, to the second device the encrypted password associated with the second device and the public key of the first device;
wherein the first device is configured to perform a login to the first device when the authentication service is off-line by sending to the second device a request to log in the user to the first device;
wherein the second device is configured to:
verify the identity of the user; and
following a successful identification of the user:
decrypt the encrypted password associated with the second device to obtain a clear password;
encrypt the clear password with the public key of the first device to obtain the encrypted password associated with the first device; and
send the encrypted password associated with the first device to the first device;
wherein the first device is configured to:
decrypt the encrypted password using a private key associated with the public key of the first device, to obtain the decrypted password; and
using the decrypted password to perform the login.

20. The system of claim 11, comprising:
a first device; and
a second device associated with the user;
wherein the processor is configured to send, in a preparation stage, to the second device the encrypted password associated with the second device;
wherein the second device is configured to:
decrypt the encrypted password associated with the second device;
verify the identity of the user;
following a successful identification of the user, present the decrypted password to the user; and
wherein the first device is configured to perform a login to the first device when the authentication service is off-line by:
obtaining the decrypted password from the user; and
using the decrypted password to perform the login.

* * * * *